Feb. 6, 1962 F. X. COSTANZO 3,020,068
COUPLING OF LINED PIPE AND METHODS
Filed Feb. 18, 1959 2 Sheets-Sheet 2
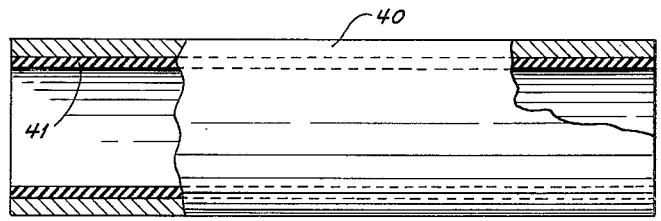
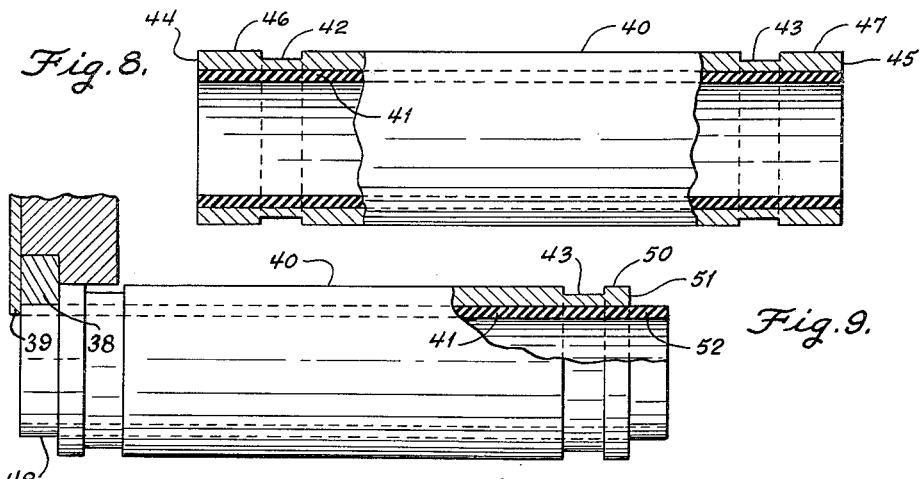
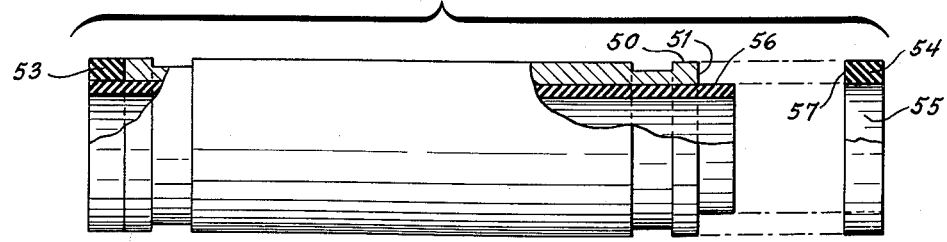
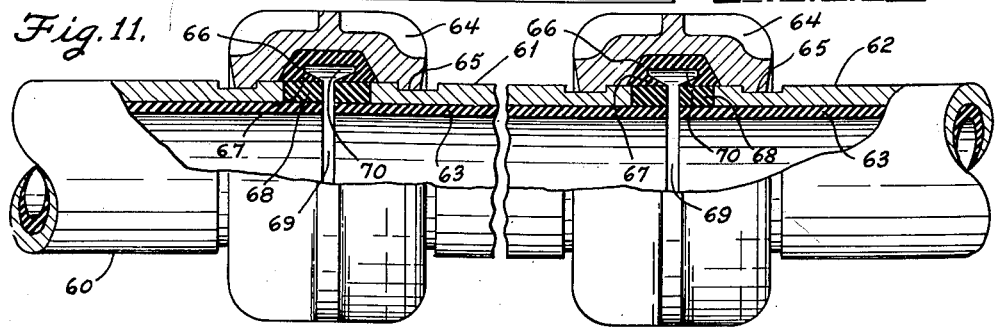
INVENTOR.
FRANK X. COSTANZO
BY
ATTORNEY.

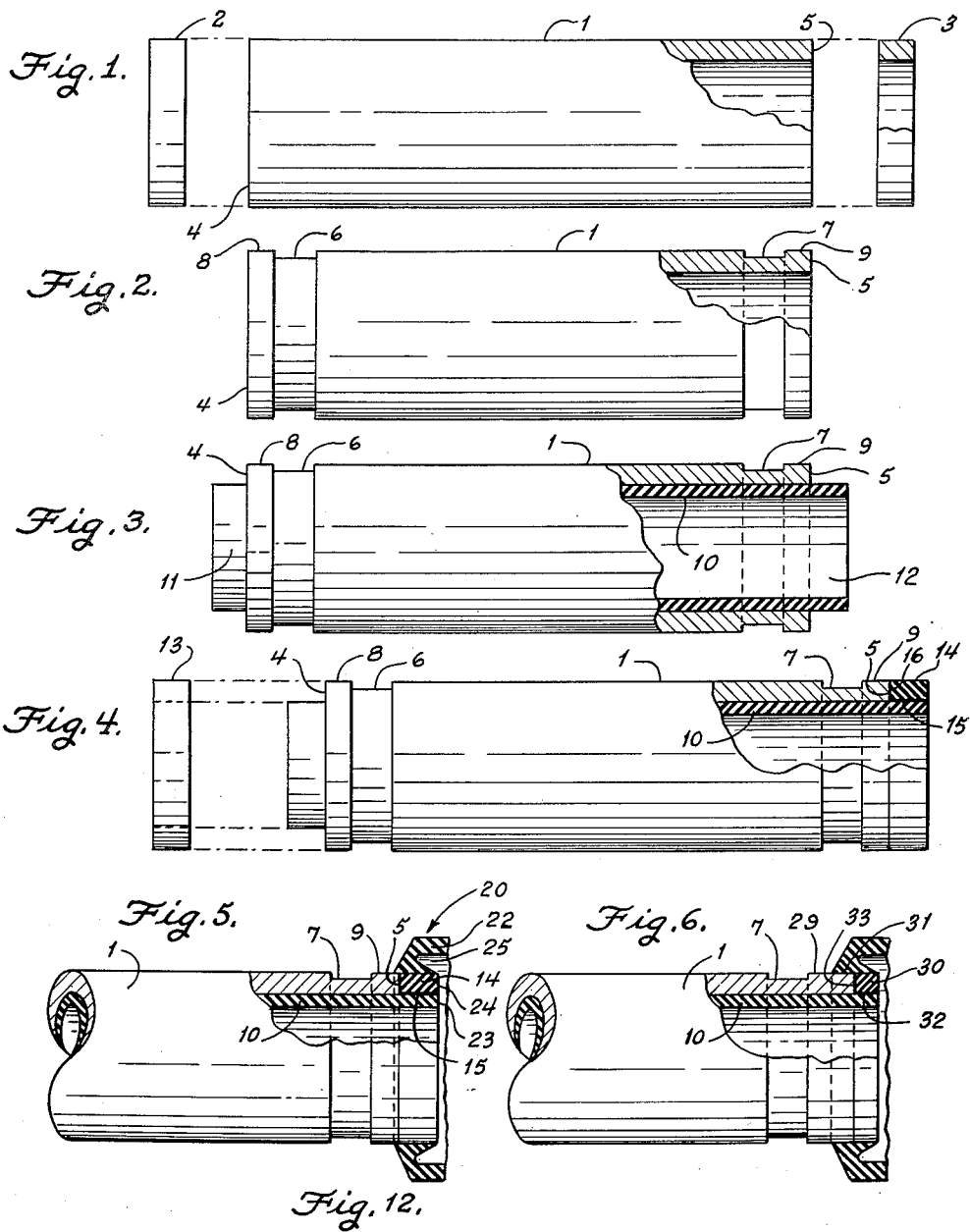

United States Patent Office 3,020,068
Patented Feb. 6, 1962

3,020,068
COUPLING OF LINED PIPE AND METHODS
Frank X. Costanzo, Cranford, N.J., assignor to Victaulic Company of America, Union, N.J., a corporation of New Jersey
Filed Feb. 18, 1959, Ser. No. 794,058
15 Claims. (Cl. 285—55)

This invention relates to the coupling of lined pipe and is particularly concerned with grooved end lined pipe formed for coupling, with methods for preparing such pipe and with pipe joints including section of such pipe.

Where fluids transmitted through pipes are of a nature to corrode or abrade common pipe materials or be contaminated by such materials, the practice, where it is desired to use such pipe, is to guard against those actions by lining the pipe with suitably resistant material. Such linings may be of rubber, a plastic, cement, lead, or other suitable material. A problem still exists in the preparation of the ends of sections of such pipe for coupling, or joining, by means of grooves in the pipes engaged by clamp type coupling housings containing gaskets bridging over the pipe ends. This problem is due to the fact that if the pipe is merely terminated, or cut off at the end, the raw metal of the pipe will be exposed in the joint to contact with the fluid flowing through. Thus, corrosion, contamination, etc., will set in.

One method for protecting the end face of the pipe is to recess the pipe exterior part way back from the end face and then continue the pipe lining from the interior up over the end, lapping it back into the recess and securing it there. All of this must be done in the pipe mill and must be carefully and accurately done, since the grooving and pipe and dimensions must be in keeping with established standards if the coupling housings are to fit properly. It cannot be done by workers in the field, so odd lengths needed in the field must be sent back to the mill or factory to be prepared, or must be ordered especially.

Another prior art procedure calls for cutting off a portion of the pipe and its lining at a position between the groove and end and replacing the removed portion in its entirety by a ring of material comparable to the lining. Such rings are adhered to the pipe end in place of the cut-off portion. For a variety of reasons this system has not proven particularly satisfactory.

The invention provides a full solution to the problem and does so in a simple and economical manner. It simplifies the work where the end preparation is done in the pipe mill. In addition it enables the workman in the field to prepare ends as effectively as is done in the mill whenever odd lengths are needed to complete the piping set-up. The resultant product is strong, fully effective and conforms with established standards for the coupling of grooved end pipe.

If the grooving is to be done prior to the application of the lining to the pipe, such as in the pipe mill, the grooves are formed at positions closer to the ends than the standard distance. The difference is to be made up by protective end rings. After the grooving is effected the lining is secured within the pipe with its ends protruding from the ends of the pipe to an extent equal to the width of the end rings to be applied. Then the protective end rings, of the exact same O.D. as that of the pipe, and of the same I.D. as the O.D. of the lining, are slipped over the extending portions of the lining until they butt up against the metal pipe ends. These end rings are formed of material compatable with the lining.

By suitable adhesive the protective rings are adhered to both the lining and the pipe ends. When the adhesive has set, the pipe is ready for coupling in standard manner, using standard coupling housings and gaskets. Furthermore, the O.D. of the ring forms a fully effective seat for the coupling gasket and the pipe joint is of adequate strength.

Where the job has to be done in the field with pipe on hand which is already lined, the pipe is first cut to the required length then exteriorly grooved adjacent one or both ends as needed. Here the grooves are formed at the standard distance back from the pipe end. Then short longitudinal sections of the metal pipe between the end and the groove are removed. While the metal is removed the lining is uncut and remains protruding outwardly from the new ends of the metal pipe. The pipe is now ready to receive protective end rings compatible with the lining the same as is done in the mill type of operation.

It is accordingly an object of the invention to improve on the coupling of lined pipe, employing grooved ends and coupling housings engaged therewith.

Another object is to provide improvements in the pipe itself as prepared for coupling.

Another object is to provide methods for preparing lined pipe for coupling.

Still another object is to provide such methods which may be performed in the field and in the factory.

A further object is to provide the improved pipe joints including sections of lined pipe.

A still further object is to provide for the preparation of lined pipe for coupling in a simple, economical manner, which preparation can be carried out by relatively unskilled workmen with simple tools.

Further and more detailed objects of this invention will in part be pointed out and in part be obvious as the description of the invention taken in conjunction with the accompanying drawing proceeds.

In that drawing:

FIGURE 1 is a part elevational and part sectional exploded view of a piece of pipe of standard length with end portions removed therefrom as done in the pipe mill.

FIGURE 2 is a similar view showing such pipe with coupling grooves formed therein.

FIG. 3 is a view of the same pipe section with the lining secured therein.

FIG. 4 is a similar view with the lefthand end thereof shown in exploded form with the protective end ring about to be applied; and with the righthand end showing the protective end ring already secured in place.

FIG. 5 is a view of a section of pipe prepared as at the righthand end in FIG. 4, showing a coupling gasket positioned in place thereon.

FIG. 6 is a view similar to FIG. 5 of a slightly modified form of the invention.

FIG. 7 is a part elevational and part sectional view of a piece of pipe with the lining therein as it might appear in the field when cut to an odd length.

FIG. 8 is a similar view showing the pipe formed with coupling grooves therein at the standard distance from the ends thereof.

FIG. 9 is a view of the pipe of FIG. 8 with a section at the righthand end thereof already removed to expose the lining and with the lefthand end being worked on for the removal of such a section.

FIG. 10 is an exploded view of the pipe of FIG. 9 with the protective end already secured in place on the lefthand end thereof and such ring ready to be secured to the righthand end thereof.

FIG. 11 is a part elevation and part sectional view of a run of piping with the ends of sections joined in accordance with the invention; and FIG. 12 is a fragmentary portion, part in section and part in elevation of a piece of pipe prepared in accordance with the prior art.

In the foregoing and in the description to follow the invention has been referred to and will be illustrated as applicable to a section of standard pipe prepared for coupling by the cutting of grooves in the exterior thereof. It is to be understood, however, that such showing is for illustrative and not for limiting purposes since the invention is equally applicable to thin wall pipes and tubing having grooves rolled therein as well as to pipe which has the grooves formed therein in any other manner. Furthermore, though for simplicity of presentation, the invention is shown as applied to sections of straight pipe, it is to be understood that it is equally applicable to pipe fittings, of which elbows, T's and valves are non-limiting illustrations. In other words, the invention is applicable to the various elements employed in the course of a pipe line to render such line fully effective.

In FIG. 1 a section of pipe 1 is shown just after the same has had ring portions 2 and 3 removed therefrom. This is to reduce the length of the metal pipe so that it can be grooved for the reception of the key section of coupling housings at positions closer to the end than the standard. Obviously a simple ring having twice the length of one of the rings 2 and 3 can be cut from either end, leaving the section 1 of the same length. However, if both ends of the pipe need toning up, separate sections may need to be cut off, one from either end. In either event the ends 4 and 5 of the pipe should be flat and in a plane at right angles to the longitudinal axis of the pipe.

In FIG. 2 the pipe 1 is shown with the grooves 6 and 7 cut thereinto. These have straight sides and a flat cylindrical bottom and can be cut into the pipe from the outside without unduly weakening it when it is standard pipe of standard thickness. For lighter walled pipe or tubing rolling of the grooves into the pipe is necessary since the pipe wall would not be thick enough for the cutting of a groove. The invention is equally applicable to pipe with cut or rolled grooves therein.

It is to be noted that the surfaces 8 and 9, between the grooves 6 and 7 and the ends 4 and 5, respectively, are quite short in the axial direction. Normally, and in keeping with established standards, the length of these surfaces, known in the trade as the "A" dimension, is adequate for the seating of the lips of the pressure responsive or other type of gasket bridging the pipe ends plus the overlying or seating of an annular portion of the coupling housing thereon. Here, however, the surfaces 8 and 9 have been reduced materially below that dimension. The difference, however, is made up by the application of protective end rings. First, however, the lining must be secured in the pipe.

The partially prepared pipe section of FIG. 2 is shown in FIG. 3 with a lining 10 applied thereto. This lining may be of the desired thickness depending on the job it has to do and the material of which it is made. The material may range from soft through hard rubber, through various plastics as to cement or concrete and soft metals such as lead. If the effects of abrasion are to be overcome a relatively soft though tough resilient lining, like rubber, is needed so that the particles will be caused to bounce off without being able to effect a scraping action. Where chemical action is to be guarded against then a wide variety of materials is available to choose from.

Preferably the lining 10 is adhered in place within the pipe. It does have end portions 11 and 12, however, which extend out beyond the respective ends 4 and 5 of the pipe. This extension is of the same length as that of the rings 2 and 3 initially removed from the pipe to prepare it for coupling in accordance with the invention. Thus the lining has the same length as that of a standard pipe section. The pipe is now ready for the application of the protective rings to prevent the fluid within the pipe from coming into contact with the metal of the ends 4 and 5.

Like the extending portions 11 and 12 of the lining 10 the protective rings 13 and 14 have the same length as the removed metal rings 2 and 3. Their I.D. is the same as the O.D. of the lining 10 and their O.D. is the same as that of the pipe 1. Thus, when secured in place over the lining extensions 11 and 12 and secured against the pipe ends 4 and 5, the rings 13 and 14 restore the "A" dimension to its standard length. At the same time the rings 13 and 14 and the securing of them should impart sufficient strength to the reassembly to give assurance that the coupling will be fully effective. If then the lining is of readily soft material, of which soft rubber is an example, the protective rings should be of a harder material, compatible with the soft rubber so that they will adhere effectively. If the lining is of hard material, however, the rings can be of the same material as the lining. If a polyvinylchloride lining is employed, for instance, the rings should also be of polyvinylchloride.

The question with regard to the protective rings is of course at first whether they are of the material to prevent any corrosive or other action when contacted by the fluid within the pipe since joints of the type in question permit such contact. Secondly, the question is one of adherence between the rings, such as 13 and 14, and the lining material 10. Thus, rings which are in some respects of quite dissimilar material from that of the lining can be used so long as proper adherence and a tight seal may be made by them and the lining to prevent any material to seep through between the two to contact the pipe ends. For example, rings of stainless steel may be used over rubber, rings of fibre glass windings may be used over a plastic liner, and other combinations of dissimilar materials will occur to those skilled in the art. With respect to the manner of making a tight, leakproof joint throughout the cylindrical zone 15 between the protective ring and the lining material various adhesives known to those skilled in the art are useable for securing rubber to rubber and various dissimilar materials to rubber on to a plastic, while if the lining happened to be of lead a soldered joint can be effected if a protective ring of material such as stainless steel was being used. In the event that the lining and the ring are of the same type or of otherwise compatible plastic materials, the application of a solvent to soften the opposed surfaces serves for the making of an effective, strong, leak-proof bond. Thus the possibilities for the making of a tight joint in the zone 15 are quite numerous and would readily be known to one skilled in the art.

It would generally be desirable, through not in all cases necessary, to also adhere the protective rings to the pipe ends around the annular zone such as that shown at 16 between the end 5 and ring 14, in FIGURE 4. Where the lining 10 is thick and strong enough a suitable bond in zone 15, when the rings are butted against the pipe ends, should be sufficient to enable the rings to serve effective as part of the "A" dimensions and to protect the pipe metal from contacting the fluid. However, under various conditions of installation, the adhering of the ring, such as 13 and 14, to the pipe end, such as 4 and 5, may be effected through the annular zone 16.

The righthand end of the FIG. 4 the assembly of pipe with liner and protective ring with a coupling gasket in position is illustrated in FIG. 5. Here it is seen that the gasket 20 has its lip portion 21 lying principally on the outer surface of the protective ring 14 but also extending part way on to the metal 9. This is the condition which would normally exist with the ring 14 taking up a little more than half of the length of the "A" dimension as is the case here. Obviously the same situation would exist where the other lip of the gasket in the opposed end of the bridging portion 22 engages the outer surface of the adjoining pipe. For this showing it is to be noted although the fluid through the pipe can flow past the lined ends of the lining 10, as seen at 23, and the protective ring 14, as seen at 24, and can flow up into the cavity 25 of the gasket 20, there is no way it can come into contact with the end of the metal pipe at 5. The seal along the zone 15 prevents this interiorly and the seal effected by the lip 21 of the gasket effects is exteriorly.

A slightly modified form of the invention is illustrated in FIG. 6. Here the pipe 1 with lining 10 and the groove 7, has had a shorter portion removed from its end providing its gasket seating portion 29 then was done with respect to portion 9 of the previous form. Thus the reconditioning ring 30 is of shorter axial extent than the rings 13 and 14 and the gasket lip accordingly overlies and the end portion 29 to about the same extent it overlies the reconditioning ring 30.

A shorter ring 30 can be employed where it is certain that a tight seal can be effected in a short cylindrical zone between the ring and the liner as seen at 32, or where such a seal taken in conjunction with a good seal in the annular zone 33, gives adequate assurance that none of the fluid can reach the metal of the pipe end. Furthermore, it is sometimes found to shorten up on the length of the ring 30 would provide greater seating for the gasket lip on the metal. Under such conditions, for instance where the lining 10 is soft and not particularly strong. In other respects, however, the relationship of the ring 30 to the lining 10 and the pipe metal is the same as described for the rings 13 and 14.

As previously indicated the foregoing manner of forming the protected pipe section of the invention is what would be done in the pipe mill since it is there that the pipe 1 would be furnished with its liner 10. In the field, however, where a pipe line is being laid, the pipe on hand will already have the lining applied thereto. No problem is present so long as the section of pipe can be used in standard lengths and can be joined up with fittings, valves, etc. without calling for any fittings of shorter lengths. When this fitting in needs to be done, however, the invention allows for the doing of it right on the job and for the protection of the ends in an effective manner comparable to that carried out in the pipe mill. Normally, of course, one end of the pipe will be already prepared with a protective ring so all the workman has to do is to determine the right length needed for filling the gap and cut a section of the pipe accordingly. In other instances, however, where a long length of pipe has already been cut into smaller sections, or where small sections are provided by the pipe mill for just this purpose and to avoid waste, preparation of both ends of the pipe section may be necessary. How this is done is illustrated in FIGS. 7 through 10.

In the first place, it is assumed that the section of the pipe to be prepared needs that preparation on both ends as seen by the pipe section 40 in FIG. 7. Here the section is lined with a lining 41 which is co-extensive with the pipe itself and has its ends aligned with the pipe ends. The workman then takes this section of pipe and using a suitable hand tool such as that shown in U.S. Letters Patent No. 2,634,643, issued to John H. Krooss on April 14, 1953 and forms the grooves 42 and 43 therein. These grooves are at the standard distance from the ends 44 and 45 so the standard "A" dimensions will be present in the portions 46 and 47 between the grooves and the ends. However, the workman can now proceed to remove portions of the ends 46 and 47 to be replaced by protective collars of different material. This he can do by using the same tool that is used for making the grooves 42 and 43 by merely changing the pipe end stop on the tool for one which extends inward into alignment with the near side of the cutter blade 38 so that the blade will cut off the length of the pipe material desired, as another grooving operation, such length being the same as the width of the grooves 42 and 43. In fact, the makers of the tool shown and described in U.S. Letters Patent No. 2,634,643 are providing double fixed stops 39 for those tools so that when the stop is secured to the tool in one way, the position of the tool on the pipe can cut grooves such as 42 and 43 but the opposite side of the stop will have a boss on it so that when it is removed from the tool, turned 180 degrees and reapplied it will locate the tool with respect to the pipe and in position to cut off the portion of the pipe desired.

Removal of the section such as that shown at 48 in FIG. 9 by a grooving operation is preferable to a cutting off with a pipe cutter since for one thing the resultant pipe end is likely to have a better surface and for another, the removal by grooving takes off all the metal along the length of the lining to be exposed, eliminating any problem of breaking an adhesive bond between the liner and the ring and making sure that the liner will not be cut into. One can readily tell by the resulting action of the grooving tool when the metal has all been removed whereas with a pipe cutter, one might well cut into the lining to some extent without realizing it. Where, of course, the grooving in the pipe is rolled rather than cut thereinto, it is hardly likely that the grooving cutter would be present so that here the metal rings to be removed would need to be cut off by using a pipe cutter.

When the removal of the end sections has been completed the ends of the pipe, as seen at the righthand end in FIGS. 9 and 10, will be the same as in the FIG. 3 showing and will have short sections 50 remaining between the groove 43 and the pipe end 51 and so the lining 41 will extend out in the portion 52 the same as the portions 11 and 12 in FIG. 3. Hence the workman merely needs to take the protective collars, such as 53 and 54, already provided for him, and apply adhesive or solvent to their interiors 55 and/or to the exterior of the lining 41 and 56, and seat the rings on the extending portions of the lining butting them up against the pipe end 51 with further adhesive between the surfaces 51 and 57 if that is desired. When the adhesive is set or the solvent has evaporated, all of which is accomplished quickly with present day materials, the especially prepared section of pipe is ready to be applied.

A portion of a pipe line incorporating the protective features of the invention is illustrated in FIG. 11. Here three sections of pipe 60, 61 and 62 having a lining 63 therein are shown as coupled together by coupling housings 64 whose key section 65 are engaged in the pipe grooves and whose C-shaped pressure responsive gaskets 66, have their lips 67 overlying protective rings 68 secured at the ends of the pipe over the lining 63 as illustrated in accordance with the foregoing. The spacing between the ends of the pipe sections is somewhat exaggerated to show the manner in which the fluid in the pipe can flow up through the gap 69 and into the gasket cavity 70 without in any way being able to get into contact with the metal of the pipe.

Although in the foregoing specific pipe structures and specific methods for forming the same have been described with reference to the accompanying drawing, it is of course to be understood that this description and illustration is for illustrative and not for limiting purposes. In other words, since certain changes in carrying out the above method and certain modifications in the article and combination for embodying the invention may be made without departing from its scope, it is intended that all matter contained in the above description or shown in the accompanying drawings, shall be interpreted as illustrative and not in a limiting sense.

Having described my invention what I claim is new and desire to secure by Letters Patent is:

1. In lined pipe formed for mechanical coupling by employing coupling grooves formed therein, a section of pipe, a lining applied within said pipe and extending throughout the length thereof, an annular coupling groove formed in the exterior of said pipe adjacent an end thereof, the said lining having a cylindrical portion extending out beyond said end of said pipe and an annular collar of protective material overlying and in seating engagement with said extending portion of said lining and butted against said pipe end, said collar having the same external diameter as the external diameter of said pipe and terminating substantially flush with the end of the lining whereby the exterior surface portion of said pipe between said groove and said collar, and the exterior surface of said collar, form one continuous gasket engaging surface.

2. Lined pipe as in claim 1 and including said collar and said pipe end being adhered together where they abut.

3. Lined pipe as in claim 1 and including said pipe being formed of metal subject to corrosion, and said lining and said collar being formed of anti-corrosive material.

4. Lined pipe as in claim 3 and including said collar being formed of the same material as said lining and said collar and said lining being secured together by cohesion.

5. Lined pipe as in claim 3 and including said collar being formed of different material from the material of said lining and being secured thereto by an adhesive.

6. Lined pipe as in claim 3 and including said collar being of a harder material than the material of said lining.

7. The method of protecting the metal at the ends of sections of lined metal pipe to be coupled together by mechanical coupling against the action of material in the pipe and preparing said pipe for coupling which comprises exposing a portion of the lining extending outwardly beyond an end of said pipe, forming an annular groove in the exterior of said pipe at a preselected position spaced inwardly from said end, continuing the gasket seat provided by the exterior of said pipe between said groove and said end by applying a protective collar having the same external diameter as said pipe and of substantially the same length as said exposed portion of said lining, over said exposed portion of said lining, abutting said collar, having the same external diameter as said pipe, against said pipe end and securing said collar and said lining together in liquid tight engagement while substantially aligning the free end of said collar with the free end of said lining.

8. The method as in claim 7 and including selecting said collar of the same material as that of said lining.

9. The method as in claim 8 said collar and said lining being of the same plastic material and securing the same together by applying a solvent of said material to the opposed surfaces thereof.

10. The method as in claim 8 and including securing said collar and said lining together by means of an adhesive between their opposed surfaces.

11. The method as in claim 7 and including selecting said collar of a different material from that of said lining and securing said materials together by means of an adhesive between the opposed surfaces of said collar and said lining.

12. The method as in claim 7 and including securing said butted ends of said pipe and said collar together in sealing engagement.

13. The method of protecting the metal at the end sections of lined metal pipe against the action of material in said pipe, and forming sections of said pipe for coupling together by mechanical coupling employing gaskets engaging the exteriors of said pipes which comprises selecting a section of unlined pipe and forming annular coupling grooves therein aadjacent the ends thereof, leaving a portion of said pipe between said groove and said end with an undisturbed exterior gasket engaging surface. introducing a lining into said grooved pipe and exposing portions of the said lining outwardly beyond the ends of said pipe, elongating said gasket engaging surface of said pipe by applying protective collars of the same exterior diameter as that of said pipe over said exposed portions of said lining to cover said exposed portions of said lining and to terminate with the free ends of said collars substantially in alignment with the free ends of said lining, seating said collars in abutting relationship against said pipe ends to cause their exterior surfaces to form a smooth continuation of said pipe surface and securing said collars to said lining.

14. The method as in claim 13 and including, commencing with a section of pipe of standard length, cutting off a portion from the length of said pipe and exposing said lining to such an extent that the length of said pipe plus the length of the exposed portions of said lining is equal to the original standard length of said pipe.

15. The method of protecting the metal at the ends of sections of lined metal pipe against the action of material in said pipe and forming said pipe for coupling sections thereof together by mechanical coupling which comprises, forming an annular groove in the exterior of said pipe at a position spaced inwardly from one of said ends, removing a ring of metal inwardly from said pipe end part way toward said groove thereby exposing a portion of said lining, replacing said removed ring of metal by applying a protective collar of substantially the same dimensions as said removed ring over said exposed portion of said lining and securing said lining and collar together with the inner end of said collar butting against said newly formed pipe end.

References Cited in the file of this patent

UNITED STATES PATENTS

| | | |
|---|---|---|
| 227,412 | Camp | May 11, 1880 |
| 1,510,243 | Perry | Sept. 30, 1924 |
| 1,967,467 | Damsel | July 24, 1934 |
| 2,001,204 | Long et al. | May 14, 1935 |
| 2,219,576 | Moreland | Oct. 29, 1940 |
| 2,608,501 | Kimble | Aug. 26, 1952 |
| 2,613,958 | Richardson | Oct. 14, 1952 |

FOREIGN PATENTS

| | | |
|---|---|---|
| 322,834 | Great Britain | Dec. 19, 1929 |
| 523,521 | Italy | Apr. 16, 1955 |